US008510656B2

(12) United States Patent
Schwarz

(10) Patent No.: US 8,510,656 B2
(45) Date of Patent: Aug. 13, 2013

(54) INTERACTIVE STORYBOOK SYSTEM AND METHOD

(76) Inventor: Margery Kravitz Schwarz, Newton Center, MA (US)

(*) Notice: Subject to any disclaimer, the term of this patent is extended or adjusted under 35 U.S.C. 154(b) by 145 days.

(21) Appl. No.: 12/916,369

(22) Filed: Oct. 29, 2010

(65) Prior Publication Data

US 2011/0107217 A1     May 5, 2011

Related U.S. Application Data

(60) Provisional application No. 61/255,949, filed on Oct. 29, 2009.

(51) Int. Cl.
*G06F 3/14*     (2006.01)
*G06F 3/045*     (2006.01)

(52) U.S. Cl.
USPC .......................... 715/730; 715/731; 715/716

(58) Field of Classification Search
USPC .......................................... 715/730, 716, 731
See application file for complete search history.

(56) References Cited

U.S. PATENT DOCUMENTS

| 5,999,172 | A | 12/1999 | Roach | |
|---|---|---|---|---|
| 7,477,870 | B2 | 1/2009 | Lane | |
| 7,627,536 | B2 | 12/2009 | Kacmarcik | |
| 2002/0124048 | A1 | 9/2002 | Zhou | |
| 2005/0106548 | A1 | 5/2005 | Weiner et al. | |
| 2005/0181344 | A1* | 8/2005 | Lane | 434/317 |
| 2005/0260551 | A1* | 11/2005 | Rubin et al. | 434/317 |
| 2008/0256066 | A1* | 10/2008 | Zuckerman et al. | 707/5 |
| 2008/0270930 | A1* | 10/2008 | Slosar | 715/776 |
| 2009/0172022 | A1 | 7/2009 | Bathiche et al. | |
| 2009/0241054 | A1 | 9/2009 | Hendricks | |
| 2009/0246749 | A1 | 10/2009 | Thursfield et al. | |
| 2009/0265308 | A1 | 10/2009 | Brown | |
| 2009/0300475 | A1 | 12/2009 | Fink et al. | |
| 2010/0092930 | A1 | 4/2010 | Fletcher et al. | |
| 2010/0110081 | A1 | 5/2010 | Arora et al. | |
| 2011/0103920 | A1* | 5/2011 | Shade | 412/6 |

* cited by examiner

*Primary Examiner* — Andrea Leggett
(74) *Attorney, Agent, or Firm* — McLane, Graf, Raulerson & Middleton, Professional Association

(57) ABSTRACT

An interactive storybook system and method are provided that allow a user with or without the assistance of an operator to make a storybook their own by replacing markers with their own selection from a listing of provisional words and provisional images. The computer-based interactive storybook application may be used by teachers, parents, therapists, and other adults for teaching or therapy applications which assist children in learning and growing.

20 Claims, 13 Drawing Sheets

INTERACTIVE STORYBOOK SYSTEM AND METHOD

CROSS-REFERENCE TO RELATED APPLICATIONS

This application claims the benefit of priority under 35 U.S.C. §119(e) to U.S. provisional application No. 61/255,949 filed Oct. 29, 2009. The aforementioned provisional application is incorporated herein by reference in its entirety.

BACKGROUND

The present disclosure is directed to an interactive storybook tool and, more particularly, a computer-based interactive storybook application for teaching or therapy applications for teachers, parents, and therapists. While the present development will be described herein primarily by way of reference to use by parents, teachers and therapists, it will be recognized that the present system and method may find other uses as well. For example, any other adult involved in the development and health of a child could use the present system and method to assist with educational or therapeutic advancement.

Interactive or branching storybooks that are currently available enable the user to customize the story with personal information and characteristics. In addition, other available storybooks allow the user to create the scene from given lists of story objects that the user must match with the given text. Still other currently available storybooks require that the user input information and based on the user inputs the storybook program creates a story for the user. The currently available storybooks however do not enable a user to alter the storyline and create a video as they can with the present disclosure.

The present invention provides a new and improved interactive storybook method and apparatus that overcomes the above referenced problems and others.

SUMMARY

In one aspect of the present disclosure, an interactive storybook system contains one or more stories, poems, or other written narrative. It also contains scenes and/or partial scenes that are linked to the storyline and consist of the following elements: (a) pictures; (b) 2D, static and/or animated figures; (c) 3D, static and/or animated figures; (d) placeholders where text can be inserted; and/or, (e) placeholders where graphics can be inserted. The interactive storybook may be adopted for use in either or both of two modes of operation. Mode 1 allows a more advanced reader to customize the storyline and resultant set of scenes by inserting words from a predetermined list of possibilities. Mode 2 allows a beginning reader and non-reader to customize scenes and the resultant storyline by inserting pictures from a predetermined list of possibilities. In both instances, the learner is developing reading skills and an appreciation for the art of language.

That is, in Mode 1, the user of an interactive storybook system progresses through a series of screens. At various points throughout the story, there are default words or phrases and/or placeholders where the user may insert a variable word or phrase. To select a variable word or phrase, the user clicks on the default word or placeholder in the text. As he does, a predetermined list of alternative words or phrases pops up and the user clicks on the desired word substitute. As he clicks, substitute language from the pop up list is inserted into the storyline in place of the default word or placeholder. Moreover, as the user selects a language substitute from the pop up list, a graphic corresponding to his word choice is inserted into the scene, as well. As a result, both storyline and scene change accordingly. The key here is that there is a one-to-one correspondence between the alternative words and alternative graphics for each default word and placeholder, so that if the user selects a particular word to change the story, the corresponding 2D or 3D model or animation is inserted into the scene and the scene is changed, too.

In Mode 2, the non-reader progresses through a series of screens. However, rather than customizing a storyline and having corresponding graphics inserted into a scene, the user customizes a scene and has corresponding language inserted into the storyline. To customize a scene, the user clicks on the default graphic or placeholder in the scene. As he does, a predetermined list of alternative graphics pops up and the user clicks on the desired picture substitute. As he clicks, the substitute graphic from the pop up list is inserted into the scene, in place of the default graphic or placeholder. Moreover, as the user selects a graphic substitute from the pop up list, a word or phrase corresponding to his picture choice is inserted into the storyline. As a result, both scene and storyline change accordingly.

In yet another aspect, an interactive storybook system can play back the video representation of the story that was completed by the user with the words of the story displayed, e.g., scrolling by on the screen. The video can include still pictures, or, it can have one or more associated animations such that the pictures or animations are stitched together or otherwise displayed, streamed, or played back in sequence to create a continuous, customized video corresponding to the words and pictures selected by the user in creating the story. The animations could be conventional 2D animations (i.e., movement of on-screen objects) or, more preferably, the animations could be 3D, e.g., where 3D characters or models take on "animated" or "life-like" qualities (e.g., interacting with other characters or other elements of the environment) with effects such as rotation, panning, zooming, etc. (these 3D effects can be used alone or in addition to object movement), to create a 3D effect.

It should also be noted that the user need not wait until the story is completed to play back the scenes. Each screen can also be played individually, e.g., as the user goes through the screens and makes his selections, he can see the particular scene played back with default pictures and words, or with custom pictures and words, as selections and changes are made.

In yet another aspect, an interactive storybook system includes an authoring tool interface that allows people to insert their own words or words from a master set of words into the pop up menus. For example, an educator could customize pop up menus with words of his choosing to reinforce educational initiatives or a therapist could customize pop up menus with words of his choosing to support therapeutic goals. Similarly, the authoring tool interface may allow educators, therapists, or parents to access graphics from a master set of pictures and insert or substitute those graphics into the pop up menus. It may allow educators, therapists and parents to insert or substitute pictures of their own making into the pop up menus. And, it may allow educators, therapists and parents to insert or substitute child drawings and patient drawings into the pop up menus.

In yet a further aspect, the authoring tools for an interactive storybook system allows people, such as educators, therapists, counselors, parents, or students, to create their own stories and pair those stories with static and/or animated graphics.

In another aspect, an interactive storybook system includes a puzzle mode, where instead of making a custom story, certain words in the narrative and/or pop up lists combine to create a poem or rhyme.

In still another aspect, an interactive storybook system has the ability to playback the story created by the user in spoken word format. The spoken word playback could be accomplished by creating a digitized recording of the user's voice as he reads the story he has created, e.g., via microphone input and prompted inputs to capture the user reading the words/ story in his/her own voice. Alternatively, the spoken word playback could be accomplished by triggering a default or pre-recorded voice, which could consist of pre-recorded sound files such as .wav, .mp3, etc., text-to-speech synthesis.

Also contemplated is an interactive storybook system that allows the user to: (1) engage a music background or accompaniment; (2) customize scenes or objects in the scenes by coloring them; (3) printout a hardcopy of the completed story, e.g., to be used as a souvenir storybook; printout a hardcopy of the completed story in coloring book form (e.g., with black and white line art to be colored by the user), etc.; (4) personalize the story or poem by adding his name and/or a title for the story; (5) personalize the story or poem by adding his likeness; (6) print the story with or without corresponding scenes; or, (7) create a streaming video of the finished story with or without text and upload that video to the world wide web; or any combinations thereof.

One advantage of the present development resides in its combination of variable words or placeholders and corresponding graphics wherein there is a one-to-one correspondence or association between the variable words and the graphics.

Another advantage of the present development is that it can be used to help children develop language and problem-solving skills.

Yet another advantage of the present development is that new storybooks can be created by enabling the operator or user to customize pop up menus with words of choice; customize pop up menus with graphics of choice; input original stories; and/or, input custom graphics.

Still further benefits and advantages of the present development will become apparent upon reading and understanding the following detailed description of the preferred embodiments.

BRIEF DESCRIPTION OF THE DRAWINGS

In the accompanying drawings, which are only for purposes of illustrating preferred embodiments and are not to be construed as limiting the invention.

DETAILED DESCRIPTION OF THE PREFERRED EMBODIMENTS

Figure 1:
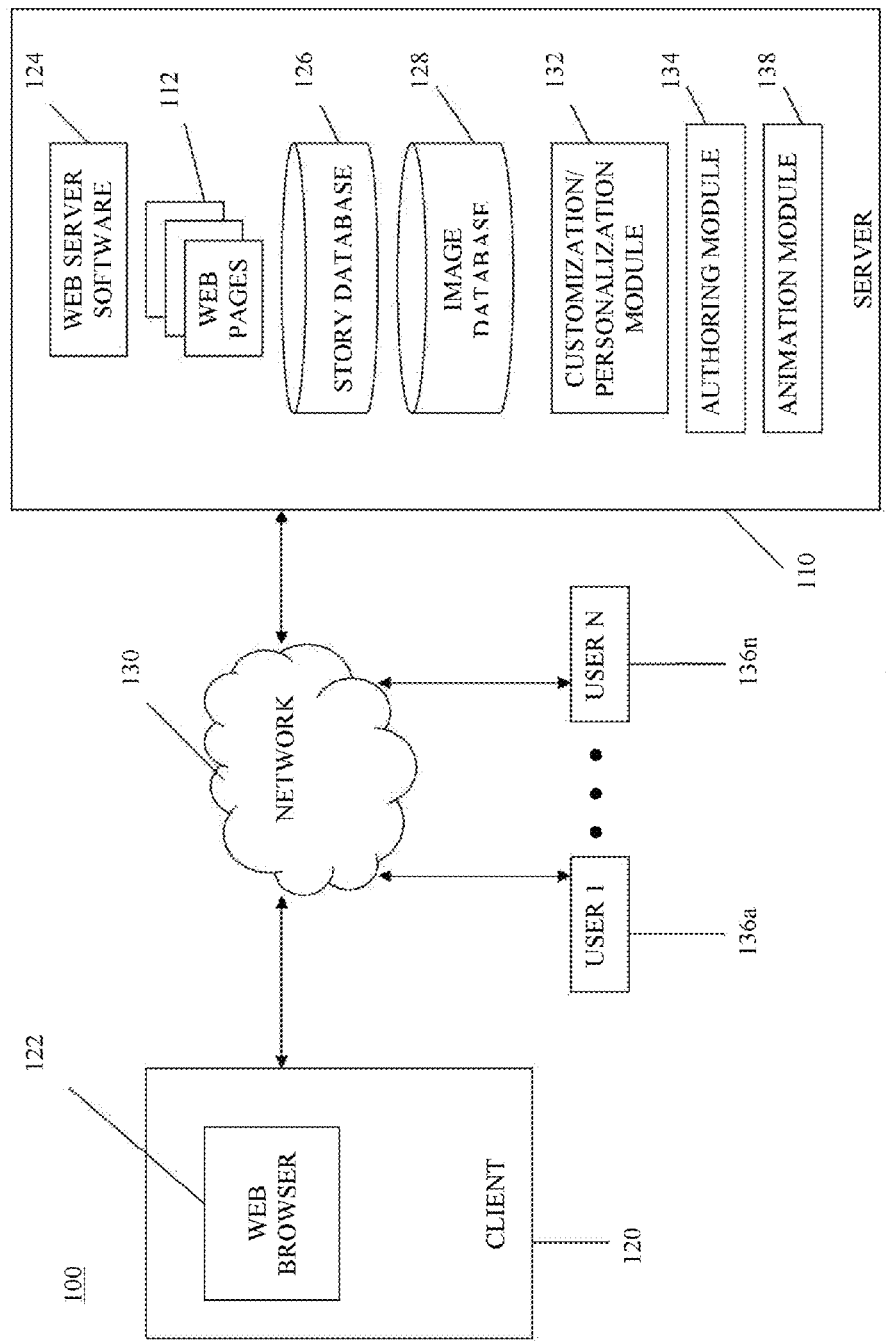
FIG. 1 is a block diagram illustrating an exemplary web browser-based embodiment of the present invention.

With reference to the drawings, wherein like reference numerals are used to indicate like or analogous components throughout the several views, FIG. 1 illustrates a block diagram depicting an exemplary computer-based information handling system 100 in accordance with a preferred, web browser-based embodiment of the present invention. The information handling system 100 includes one or more network servers 110 interconnected with one or more remotely located client computer systems 120 configured to allow a user 136a-136n to use a web browser 122 over a network 130. The client computer system 120 and server computer system 110 may be, for example, a computer-based information handling system of the type as described below by way of reference to FIG. 2.

Although the present invention will be described primarily herein by way of reference to a web or server based application accessed via a personal computer equipped with a web browser, it will be recognized that the present invention may be implemented in any type of computer-based information handling system, including but not limited to general purpose or personal computers, workstations, hand-held computers, convergence systems, information appliances, Internet appliances, Internet televisions, Internet telephones, personal digital assistants (PDAs), personal information managers (PIMs), portable communication devices such as portable or mobile telephones, hand-held or mobile devices, or the like, e.g., having a wired or wireless network connection or capability.

Likewise, although the present development will be described primarily herein by way of reference to an online application, such as an application designed to run primarily from an Internet browser as a set of hypertext markup language (HTML), or World Wide Web (Web) documents or pages, it will be recognized that the present development can also be embodied as a standalone application for execution on a computer information handling system of the user 136a-136n or operator, such as a stand alone computer or computer accessed via a network of the user 136a-136n or operator. Thus, the present invention may be accessed directly from the Internet, an intranet or other network, or may be distributed to users 136a-136n by any computer distribution mechanism, including CD-ROM and DVD, and the like.

The network 130 interconnecting the server 110 and the remote client system 120 can include, for example, a local area network (LAN), metropolitan area network (MAN), wide area network (WAN), and the like, and interconnections thereof. The network connections 130 can be an Internet connection made using the World Wide Web, an intranet connection, or the like.

The server computer system 110 and the client computer system 120 interact by exchanging information via the communications link 130, which may include transmission over the Internet. In the depicted, web browser-based embodiment, the server 110 receives hypertext transfer protocol (HTTP) requests to access web pages 112 identified by uniform resource locators (URLs) and provides the requested web pages to the client computer system 120 for display using the browser 122, as is generally known in the art.

To process the interactive storybook application in accordance with the present invention, the server system 110 operates web server software 124. An operator may access the server software 124 by operating the client computer system 120. The operator is advantageously an adult, such as a teacher, therapist, counselor, parent, or other adult, who is assisting a child user 136a-136n with using the interactive storybook application. The client computer system 120 operates the web browser software 122 that allows the operator to download and display one or more HTML files, or web pages, 112 contained on the server computer system 110. It will be recognized that the present invention may be implemented in any of a host of programming languages, may be run as client/server application, thin client application, or a standalone application. The present invention is preferably implemented using Unity, Maya, Photoshop, or Zbrush applications; although other implementations are also contemplated.

Figure 2:
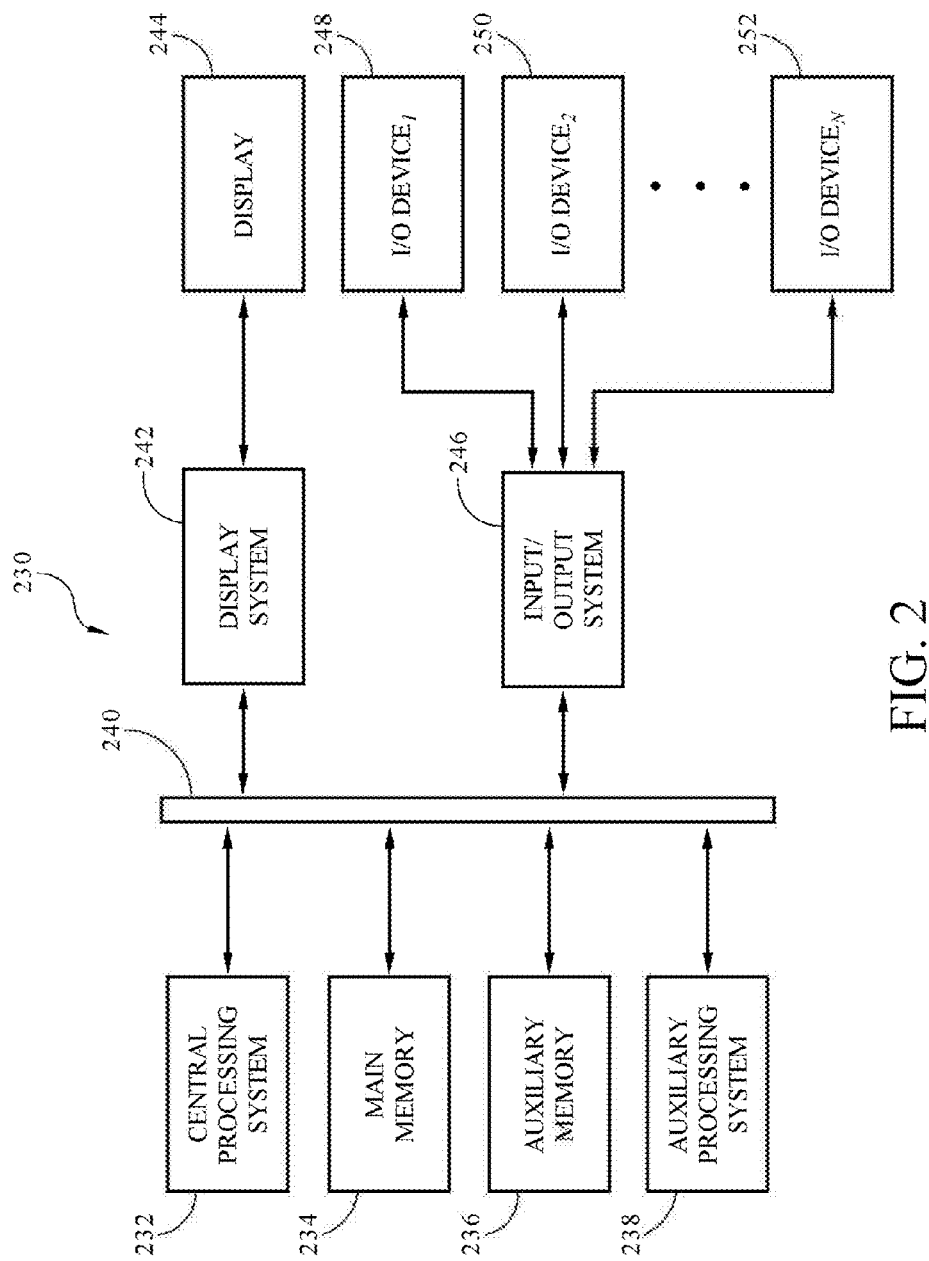
FIG. 2 is a block diagram of a hardware system generally representative of a computer-based information handling system of a type operable to embody the present invention.

Referring now to FIG. 2, an information handling system operable to embody the present invention is shown. The hardware system 230 shown in FIG. 2 is generally representative of the hardware architecture of a computer-based information handling system of the present invention, such as the client computer system 120 or the server computer system 110 of the networked system 100 shown in FIG. 1.

The hardware system 230 is controlled by a central processing system 232. The central processing system 232 includes a central processing unit such as a microprocessor or microcontroller for executing programs, performing data manipulations and controlling the tasks of the hardware system 230. Communication with the central processor 232 is implemented through a system bus 240 for transferring information among the components of the hardware system 230. The bus 240 may include a data channel for facilitating information transfer between storage and other peripheral components of the hardware system. The bus 240 further provides the set of signals required for communication with the central processing system 232 including a data bus, address bus, and control bus. The bus 240 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on.

Other components of the hardware system 230 include main memory 234, and auxiliary memory 236. The hardware system 230 may further include an auxiliary processing system 238 as required. The main memory 234 provides storage of instructions and data for programs executing on the central processing system 232. The main memory 234 is typically semiconductor-based memory such as dynamic random access memory (DRAM) and/or static random access memory (SRAM). Other semi-conductor-based memory types include, for example, synchronous dynamic random access memory (SDRAM), double data rate (DDR) SDRAM, Rambus dynamic random access memory (RDRAM), ferroelectric random access memory (FRAM), and so on. The auxiliary memory 236 provides storage of instructions and data that are loaded into the main memory 234 before execution. The auxiliary memory 236 may include semiconductor-based memory such as read-only memory (ROM), programmable read-only memory (PROM), erasable programmable read-only memory (EPROM), electrically erasable programmable read-only memory (EEPROM), or flash memory (block oriented memory similar to EEPROM). The auxiliary memory 206 may also include a variety of nonsemiconductor-based memories, including, but not limited to, magnetic tape, drum, floppy disk, hard disk, optical laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well.

The hardware system 230 may optionally include an auxiliary processing system 238 which may include one or more auxiliary processors to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 230 further includes a display system 242 for connecting to a display device 244, and an input/output (I/O) system 246 for connecting to one or more I/O devices 248, 250, up to N number of I/O devices 252. The display system 242 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like.

The display device 244 may comprise a cathode ray-tube (CRT) type display such as a monitor or television, or may comprise an alternative type of display technology such as a projection-type display, liquid-crystal display (LCD), light-emitting diode (LED) display, gas or plasma display, electroluminescent display, vacuum fluorescent display, cathodoluminescent (field emission) display, plasma-addressed liquid crystal (PALC) display, high-gain emissive display (HGED), and so forth.

The input/output system 246 may comprise one or more controllers or adapters for providing interface functions between the one or more I/O devices 248-252. For example, the input/output system 246 may comprise a serial port, parallel port, integrated device electronics (IDE) interfaces including AT Attachment (ATA), Serial Advanced Technology Attachment (SATA), IDE, enhanced IDE (EIDE), and the like, small computer system interface (SCSI) including SCSI 1, SCSI 2, SCSI 3, ultra SCSI, fiber channel SCSI, and the like, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, track ball, touch pad, digitizing tablet, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc.

The input/output system 246 and I/O devices 248-252 may provide or receive analog or digital signals for communication between the hardware system 230 of the present invention and external devices, networks, or information sources. The input/output system 246 and I/O devices 248-252 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 200 of FIG. 2 by one having ordinary skill in the art would not depart from the scope or the spirit of the present invention.

Figure 3:
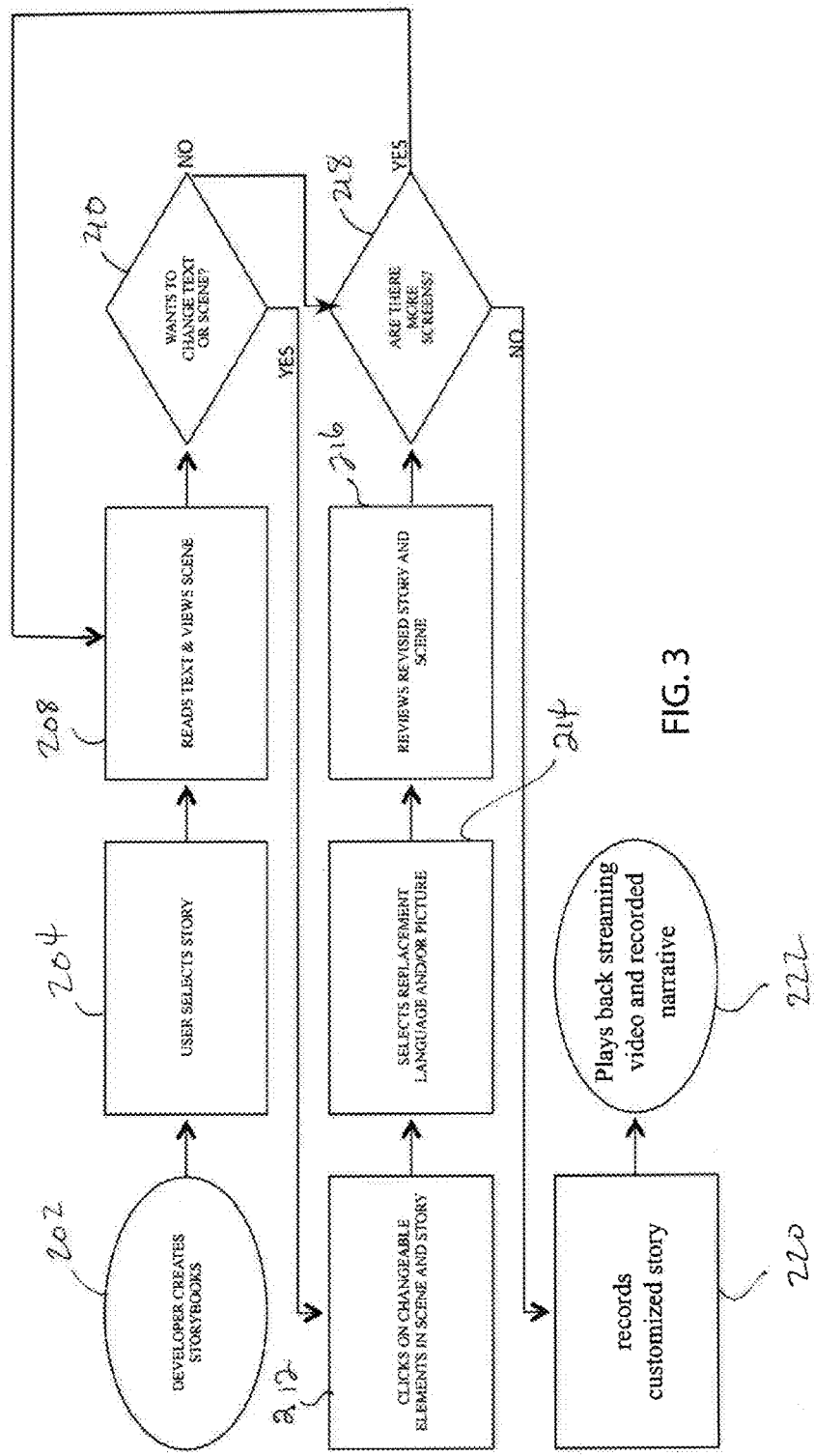
FIG. 3 is a flow diagram illustrating an exemplary embodiment of the present invention.

Referring now to FIG. 3, and with continued reference to FIG. 1, there appears a flow chart outlining an exemplary method in accordance with the present development. At step 202, the interactive storybook developer creates or edits an interactive storybook, e.g., using customized software in conjunction with commercial software (see FIGS. 4 and 5). The developer then saves the new or edited storybooks in the story data base 126 and makes them available to the operators in the interactive storybook application, for example, via the browser software 122, CD-ROM, downloadable software, etc. The story database 126 and image database 128 are shown as separable databases for ease of illustration. It will be recognized, however, that the story database and image database can be and preferably are combined in a single database or data store.

The developer inputs story data directly into the story database 126, thus creating a repository of stored text. The story database contains text for one or more scenes. Story data is comprised of static text that does not change as the user alters a storyline and/or scene and provisional or variable text that does change, as the user alters a storyline or scene.

Likewise, the developer inputs image data directly into the image database, thus creating a repository of stored image data. The graphics contained in the image database 128 are in 2D format and/or 3D format. They may be still objects or they may be animated objects. And they are either static or variable. That is, a static image, as used herein, refers to the portion or portions of the story images that do not change as the user alters the storyline and scene, and is not intended to be limited to still images, and may be video or graphic images. Likewise, provisional or variable images refer to the images that can be changed by the user as he alters the storyline and scene. For each scene, there is a one-to-one correspondence or association between each variable text element and a corresponding variable picture/graphic element.

At step 204, the operator accesses the interactive storybook application, e.g., implemented as a stand alone software application, or as shown in the embodiment depicted in FIG. 1, as web server software 124 and one or more web pages 112 residing on the server 110, accessed via the browser software 122 residing on the client computer system 120, as shown in the depicted embodiment, and selects a storybook for the user.

At step 208, the user, alone or assisted by the operator, reads the text and views the picture on the screen. The text field associated with step 208 may contain static words, e.g., words that do not change, and it may contain variable words, e.g., words that can be changed at the user's discretion. Moreover, the scenes associated with step 208 contain 2D and/or 3D animated and/or still graphics. Graphics are either static, e.g. they do not change, or they are variable, e.g. replaceable at the user's discretion. Additionally, both the text field and the scene field may contain markers or placeholders where either word or picture substitutions can be made.

At step 210, the user decides whether he wants to change the text or scene. If the user elects to change the scene, he selects a changeable onscreen element in the scene field. The changeable element may include a current graphic. It may include a marker or placeholder for a graphic, or it may include the default word associated with the graphic at step 212. As the user selects the graphic he intends to change, a list of provisional word choices or provisional picture choices is displayed on the screen. Provisional words are words that fit into the storyline and can replace the marker or default word at the user's discretion. Provisional pictures are two-dimensional still and/or animated objects and three-dimensional still and/or animated objects that visually represent a provisional word phrase and can be replaced at the user's discretion. Each provisional word has a corresponding provisional picture for the storybook scene and each provisional picture has a corresponding provisional word in the storyline.

At step 214, if the user selects a word from the provisional list of choices, then the selected word is substituted for the marker or default word and the picture corresponding to the selected word appears on the screen. On the other hand, if the user selects a picture from the provisional list of choices, then that picture is inserted into the scene and the word associated with that picture replaces the word/default word. At step 216, the user, alone or assisted by the operator reviews the revised story and scene and either accepts the story, as is, or continues to revise the story until satisfied.

If the user reaches step 218, but there are additional pages in the storybook to complete, the process cycles back to step 208 and begins again. It continues, as described above until all scenes have been completed or until such time that the user ends the program. When the user completes the last scene at step 218, the process moves to step 220, wherein he may record his customized story, e.g., via a microphone to digital audio recording in the user's voice. The user may read the text corresponding to each scene in response to on-screen prompts. Or, he may generate a digital sound recording of his customized story using prerecorded sound files, or text to speech synthesis. Likewise, although the user who reaches step 220 can record and playback his entire, customized storybook, users who do not complete an entire storybook can also record and playback their voices, and/or that of a prerecorded voice one screen at a time, as they proceed through the storybook. This is particularly useful for children with learning challenges, children with motivational challenges, children with attention deficit difficulties or children learning to read for the first time. Finally, the process proceeds to step 222 wherein the graphical elements corresponding to the customized storybook are sequenced to create a continuous video. The video may be played back, along with a full or partial version of the recorded/spoken word audio.

Although the process outlined in FIG. 3, is shown as a continuous or somewhat linear process, it will be recognized that the process may be interrupted at any time with an option to save the user's progress for resumption at a later time. Likewise, it is preferable that the user be able to navigate to any desired scene in the story, including scenes already completed and reviewed, as desired, e.g., by providing on screen icons, button, links, or other navigation devices.

Figure 4:
FIG. 4 illustrates a web page layout in accordance with an exemplary developer story database input interface.
Figure 5:
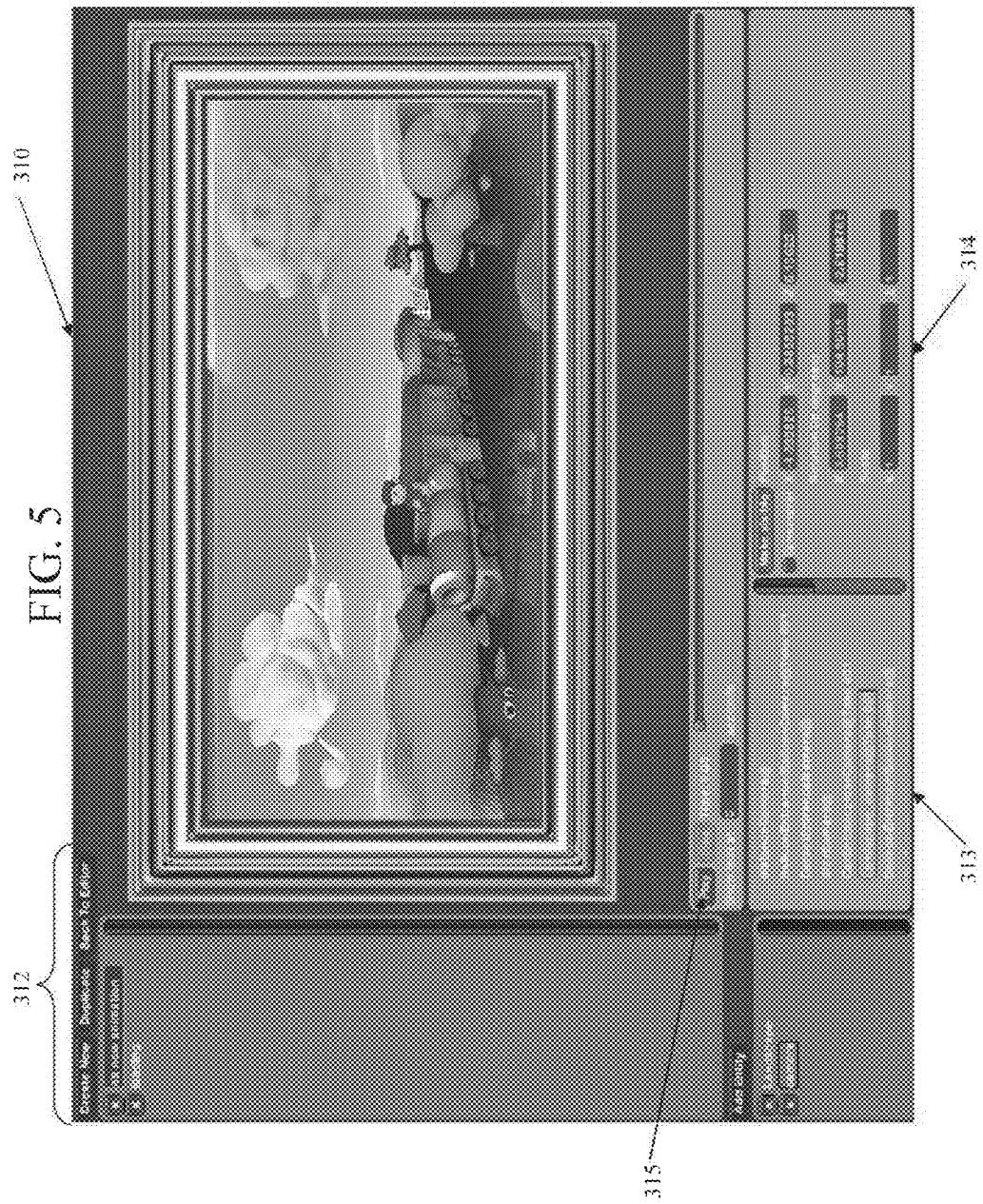
FIG. 5 illustrates a web page layout in accordance with an exemplary developer image database input interface.

The present development may also contain an authoring tool 134 (see FIG. 1). Referring now to FIGS. 4 and 5, there appear screen shots of an exemplary developer authoring tool interface. The authoring tool 134 contains the developer's input interface 300 (see FIG. 4) for loading, editing, positioning and timing text displays, as well as the developer's input interface 310 (see FIG. 5) for loading, positioning and timing graphic displays and animations. The text input interface 300 enables the developer to create text for new storybooks, as well as to open and edit the text of existing storybooks. It allows the author to create pop up menus throughout the storybook and populate those menus with words of the author's choosing. Additionally, the text input interface allows the developer to link single words and phrases with corresponding graphics and to coordinate the display of each element with the other. Text which can be created or edited includes both the static and provisional words that are on each page of a given storybook. Graphics are developed using commercially available software and imported into the image data base. The image database input interface 310 enables the developer to open existing images, re-size them, time their entrance onto the scene, and position them within the scene. The images which the developer adds may be both static and provisional pictures and animations. Once the developer completes the text and/or images for a new storybook or edits the text and/or images of an old storybook he finalizes the storybooks and makes them available to the operators and users.

As best seen in FIG. 4, the developer text input interface 300 includes an insert menu 302, an insert dynamic text menu 304, and a layout menu 306. Stories are typed directly onto the screen, as in Layout #1 308. The insert menu 302 is then used to create popup lists of alternative word choices for one or more words in a story. As the user progresses through the story, he selects words from these pop up lists to substitute for changeable text, thus customizing his story. Once the stories have been written, they can be saved 306 and re-opened 306 at the developer's discretion. Finally, the developer can construct a simple algorithm using the editor 304 to ensure that words relating to the word choices inserted by the user e.g., pronouns, etc. are grammatically correct.

As best seen in FIG. 5 an exemplary developer image database input interface 310 includes a main menu 312, an image selection menu 313, a graphic editing region 314, and a review menu 315. The main menu 312 enables the developer to create new scenes as well as to duplicate existing scenes for editing. The image selection menu 313 enables the developer to select stored images and animations which may be added to the selected scene. The graphic editing region 314 enables the developer to manipulate the graphics or animations that will appear while the user creates his story or plays it back after creation, e.g., via an animation module or function 138 (see FIG. 1). The review menu 315 enables the developer to play back the scenes that he creates or edits to enable the developer to determine whether further edits are needed. The developer can then link the on screen images or animations with a given storybook or a provisional text selection using the story database input interface 300.

Figure 10:
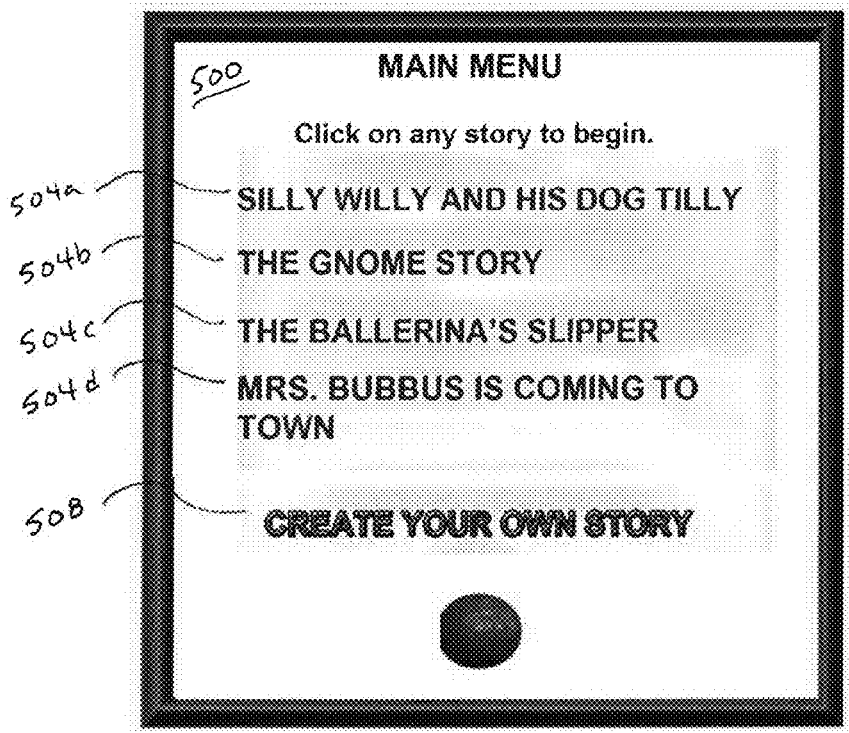
FIG. 10 illustrates an exemplary main user interface screen or menu in accordance with an exemplary embodiment.

It is also contemplated that an operator or user could access an operator authoring tool interface 400 to create his own story, song, or poem, to add provisional words to the popup menus, and/or to add pictures and animations to the provisional picture popup menus using authoring button 410 on the main storybook screen. The operator could be an educator, therapist, counselor, parent, caregiver, or other adult. As best seen in FIG. 10, there is an exemplary embodiment of the operator authoring tool interface 400. The operator authoring tool interface 400 having a provisional word editor 414, a provisional graphic editor 416, a story editor 418, a connection editor 420, a review menu 422, and a publish menu 424. The provisional word editor 414 allows the operator to edit or add new words to the listing of provisional words that the user may select from while reading the story. The provisional graphic editor 416 allows the operator to edit or add new pictures or animations to the picture menu. The story editor 418 allows the operator to create stories or poems having one or more pages. The connection editor 420 allows the operator to link the provisional text with the provisional pictures or animations which the words represent. The review menu 422 enables an operator to play their created or edited story to determine if any changes are desired and allows the operator to return to the authoring tool interface 400 to make additional changes if desired. The publish menu 424 allows the operator to save the new or edited story and make it available to a user for reading.

An educator could also use the authoring tool interface 400 to customize pop up menus to correspond to lessons, vocabulary, etc., for use in an educational setting or a therapist could create an interactive story for use in a therapeutic setting to support therapeutic goals. The authoring tool interface 400 also allows educators, therapists, counselors, or parents to insert or substitute pictures or animations into the interactive storybook system to be used as options in the pop up menus from (1) from a graphic database available over the Internet, (2) from a master set of graphics available in the authoring tool interface 400, (3) of their own making or design, or (4) that a child and/or patient has designed. The authoring tool interface 400 of the interactive storybook system also allows operators to create their own stories and pair the stories with static and/or animated graphics or their own or another's creation.

Figure 6:
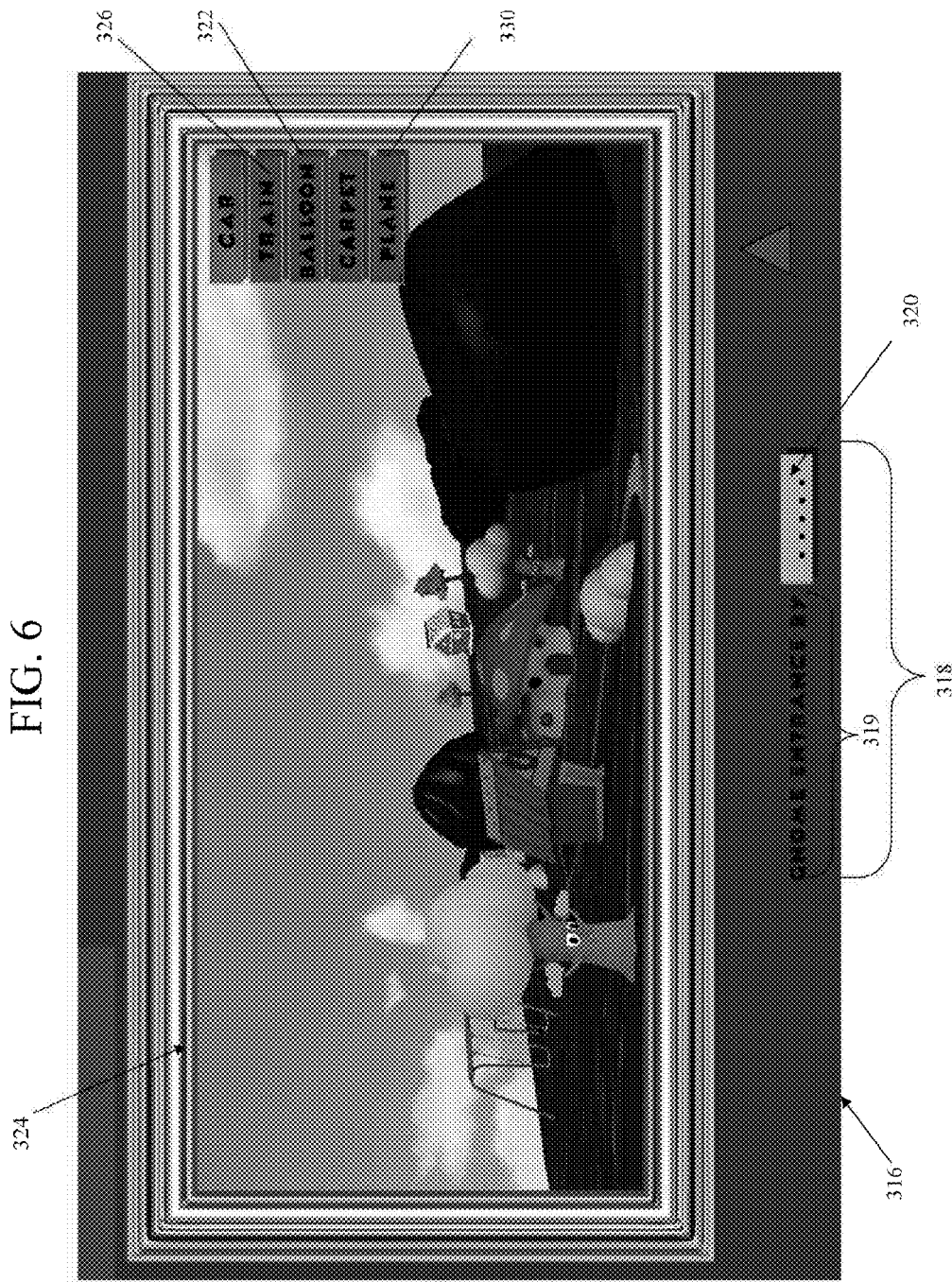
FIG. 6 illustrates a web page layout in accordance with an exemplary user interactive storybook interface.
Figure 7:
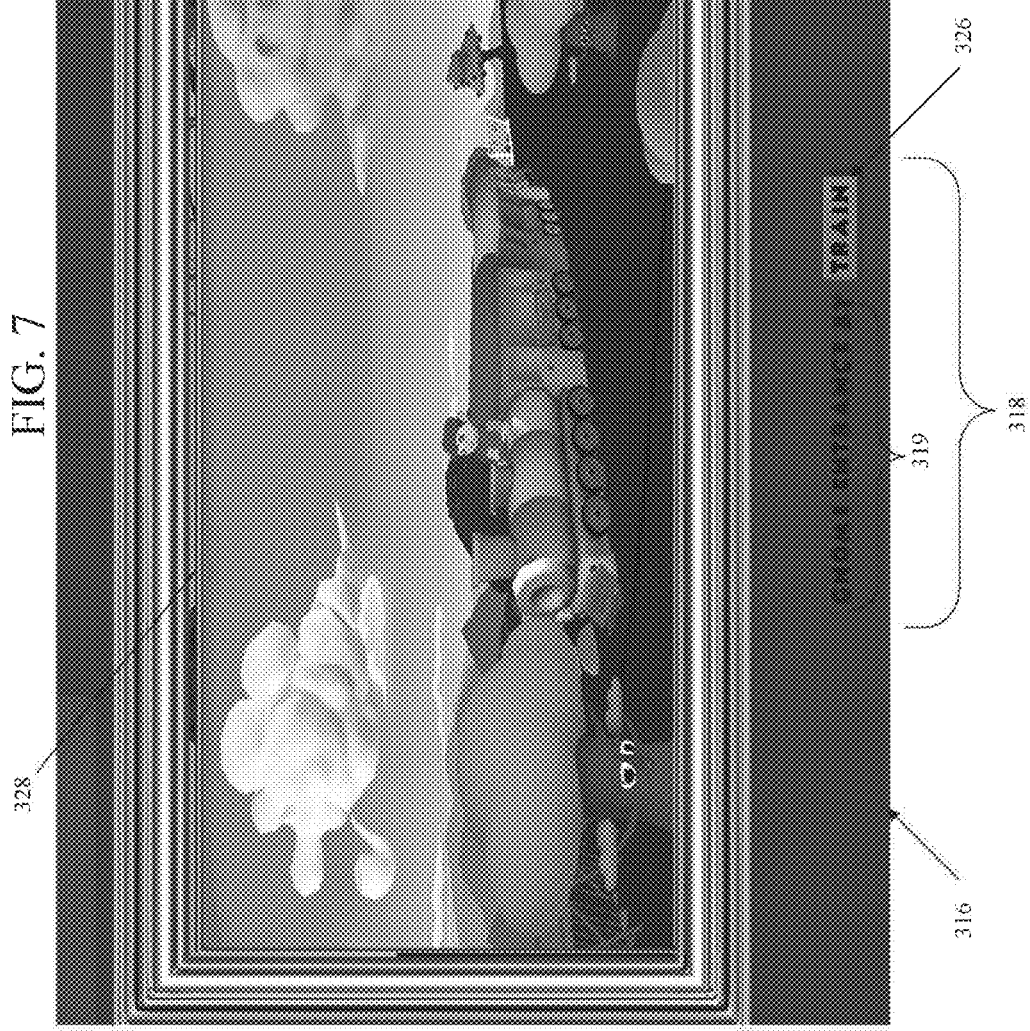
FIG. 7 illustrates a web page layout in accordance with an exemplary user interactive storybook interface.

An exemplary embodiment of the interactive storybook apparatus is shown in FIGS. 6-9. Referring now to FIGS. 6 and 7, there appears an exemplary screen 316 showing the first page of an interactive storybook which the user 136a-136n, alone or assisted by the operator, reads the text 318 and views the graphic or picture 324 on the screen 316. The text 318 contains a static word portion 319, i.e., wording in the storyline that does not change. Similarly, the graphic 324 includes a static portion comprising elements of a scene that do not change and markers or placeholders where either word or picture substitutions can be inserted. The user then selects the marker 320 and a list of word choices 322 is displayed on the screen 324. The user may select a word from the list of choices 322 and the selected word 326 is substituted for the marker 320 which is discarded. In addition, a corresponding picture 328 from the image database 128 which is associated with the selected word 326 in the storybook database 126 appears on the screen 316. After the word 326 and picture 328 are substituted for the marker 320 the user, alone or assisted by the operator, re-reads the text 318 with the selected word 326 and views the picture 328 on the screen. The user may then decide if he/she likes the selected word 326 and associated picture. The selected variable text 326 is preferably differentiated from the static text 319 by shading, outlining, box, etc., to identify the dynamic text as being selectable by the user to further change the selected word (and thus the corresponding graphical image) if the user so desired.

Figure 8:
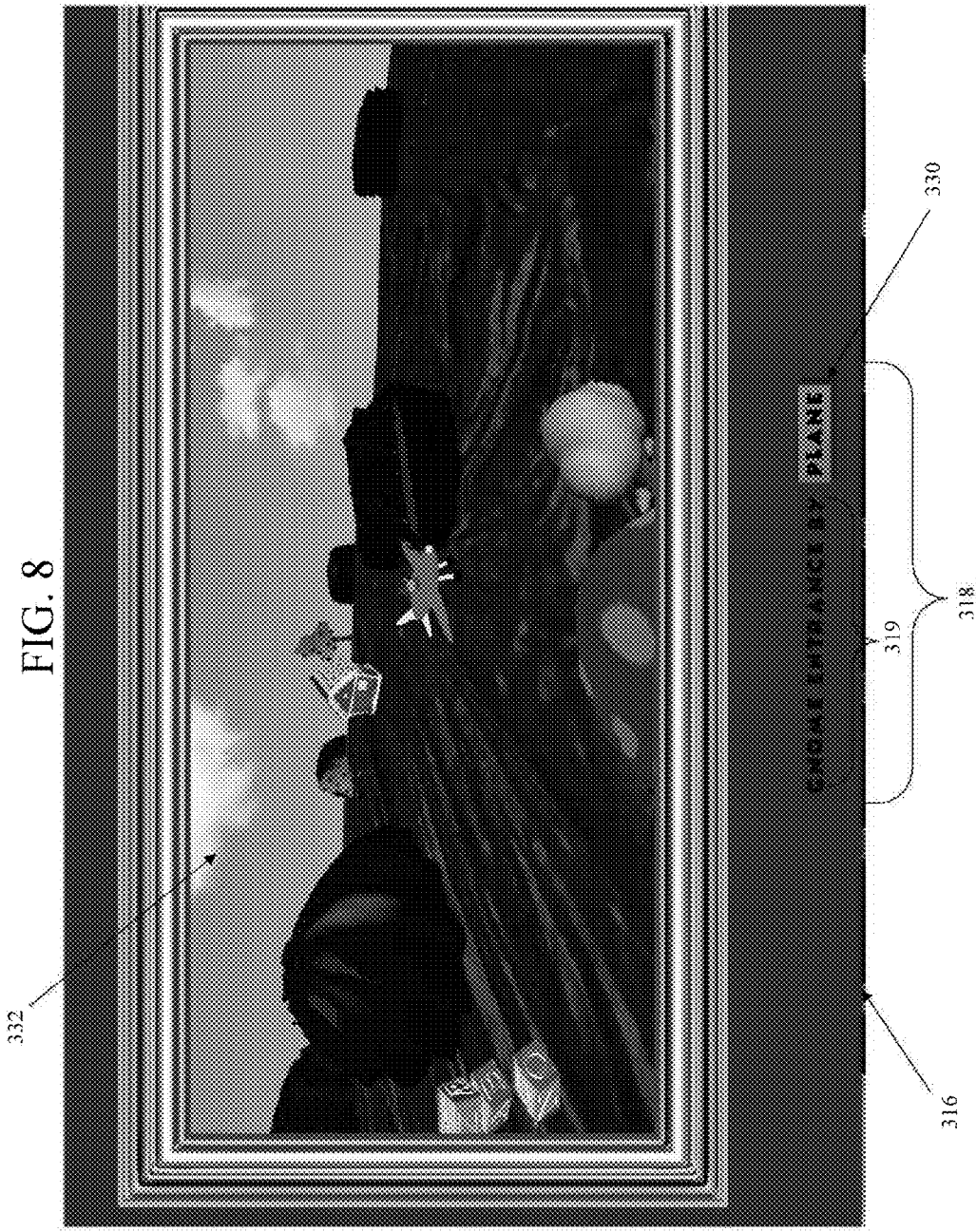
FIG. 8 illustrates a web page layout in accordance with an exemplary user interactive storybook interface.

Referring now to FIG. 8, with continued reference to FIGS. 6 and 7, if the user does not like or wishes to change the selected word 326, then the user may click on the variable word 326 to display the list of substitute word choices 322 and select a different input from the list 322. Once the user selects a new substitute word 330 from the list 322, the newly selected word 330 replaces the prior substitute word 326, which is discarded, and the picture 332 in the image database 128 that is associated with word 330 in the storybook database 126 appears on the screen 316. Once the word 330 and corresponding associated picture 332 are shown on the screen 316, the user, alone or assisted by the operator, re-reads the text with the substituted word 330 and views the picture 332. The user may then decide if he/she likes the selected word 330 or wishes to select a different word from list 322. The user may continue to select different words from the list 322 as many times as he or she likes. When the user finds a selected word he/she likes, the user may continue on to other pages of the story.

Figure 9:
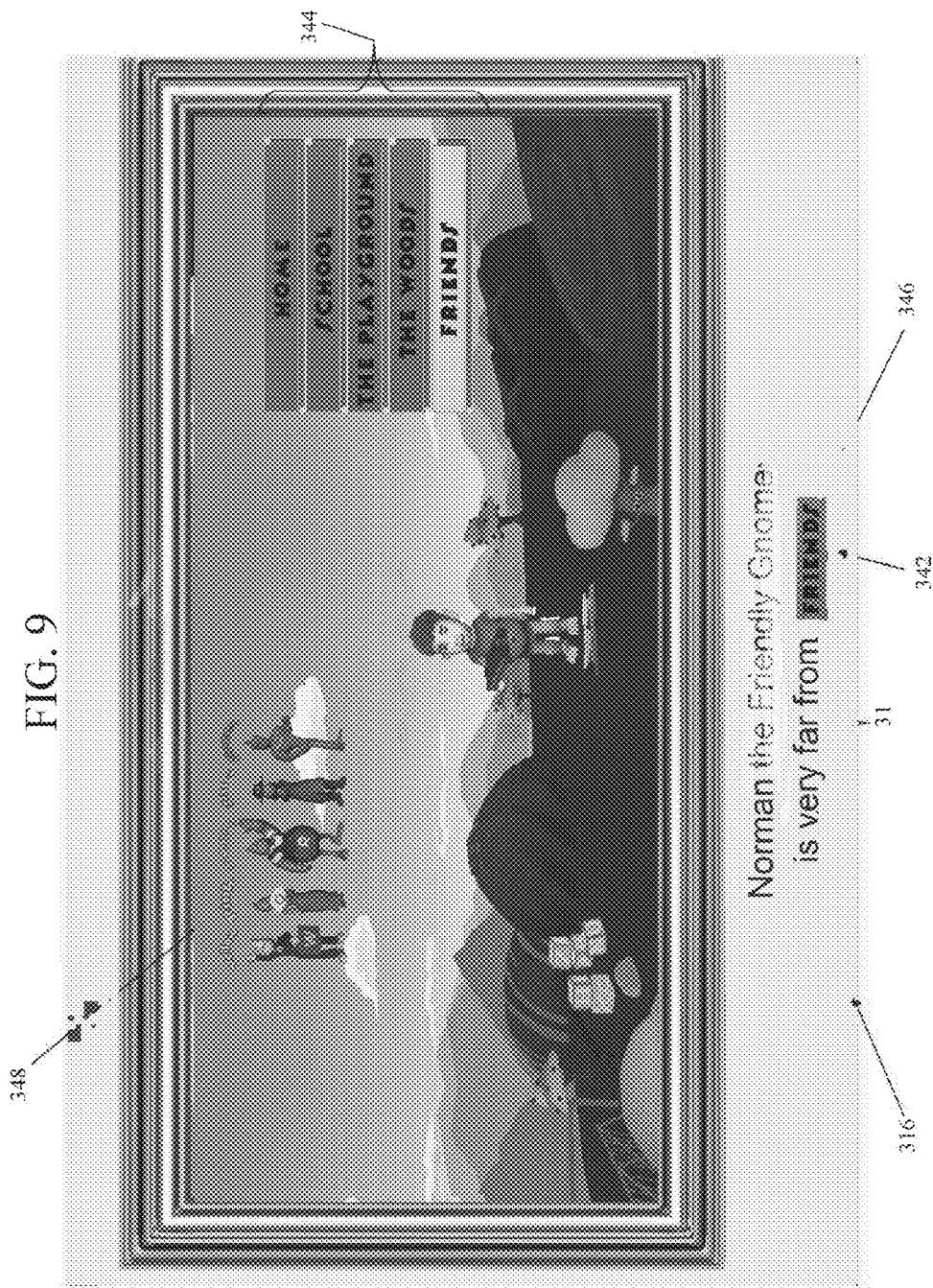
FIG. 9 illustrates a web page layout in accordance with an exemplary user interactive storybook interface.

Referring now to FIG. 9, if there is another page, the user goes to the next page 340 by clicking on a next button (not shown) on the storybook main menu (not shown) and the user, alone or assisted by the operator, reads the text 318 and views the picture 324 on the screen 316 of the new page. The user then proceeds to select the marker 342 which shows the list of word choices 344 and the user 136a-136n selects a substitute word 346 with an associated picture 348, as described above. The user may repeat this process for each page in the selected storybook until there are no more pages in the story, at which point the user may re-read the story he/she created, play a streaming video version of the story he/she created, or exit the program. It is also contemplated that the user may print out the text of the storybook he/she created, print out the text and images of the storybook he/she created, or print out the text and images of the storybook he/she created in black and white (e.g., lines art) as a coloring book.

It will be recognized that the interactive storybook process illustrated in FIGS. 6-9 is exemplary and explanatory only and is not intended to be limitative of the invention. In the illustrated embodiment, the user selects a provisional word marker 320 to alter the storyline and scene. However, in an alternative embodiment, the user to reveal the selection menu 322 may select a provisional picture marker e.g., on screen field, button, icon, etc., in the graphic 324 rather than the provisional word marker 320 and make changes to the storyline and scene based on selection of a desired word from the menu 322, as described above. When a user clicks on a provisional picture marker, a popup menu of word substitutions appear. The word substitutions correspond to the provisional picture the user selected, along with language associated with other pictures in the image database 128 that can be inserted into the scene. The user then selects the substitute language that best represents the picture he/she wants to insert into the scene. As the selection is made, the storyline and scene change accordingly by inserting the language substitute into the storyline text 318 in place of the provisional word or marker and inserting the corresponding provisional picture from the image database 128 associated with the selected word into the scene.

Optionally, the interactive storybook of the present disclosure may contain an animation feature which the user may select for the storybook they are using. When the animation feature is active, and the user clicks on a provisional word from the popup menu, the pictures corresponding to the selected word choice animate. In addition, when the animation feature is active and the user selects the playback button (not shown) on the storybook main menu (not shown) on a given screen, the animated feature of the two-dimensional and/or three-dimensional pictures on that screen are triggered and the pictures animate. The animation may be accomplished, for example, by providing a series of 2D images displayed in sequence to create the illusion of movement. Alternatively, the animation may be accomplished by manipulating the display of on screen objects that have been modeled in 3D. If the user selects the playback button at the end of the storybook or a poem, then the animated and still scenes combine to create a storyline stream across the screen in succession, along with the associated elements of the storyline or poem. Optionally, a completed story can be output for storage in a known video format, such as MPEG, MJPEG, AVI, DVI/RTV, Indeo Video formats, or the like.

The present disclosure may also contain an auditory feature which the user may activate. For example, when the auditory feature is activated and the user clicks on a provisional word or substitute language from a popup menu within the storybook, the word or words are read aloud. The auditory output may be realized by a text to speech function or module in the web server software 124, and/or via playback of digital recordings of the text elements being spoken, e.g., that have been pre-recorded and stored in a sound file database in the server 110. In addition, when the user clicks on a designated button on the screen and the auditory feature is active, the section of the storybook or poem appearing on the screen is read aloud. The auditory feature also allows a user to select the playback button at the end of the storybook to have the words and respective animated and still scenes depicting the storyline or poem scroll by as the entire storyline or poem is read aloud.

Another contemplated embodiment includes a puzzle feature, in which embodiment the operator selects a puzzle, rather than selecting an interactive storybook. In puzzle mode, the screen 316 shows a partial poem and/or story having static words and/or provisional words and one or more markers. The user may substitute the provisional words and/or fill in the markers by selecting words from a popup menu in the manner described above. The challenge for the user in puzzle mode is to select the word from a popup menu that completes a rhyming poem, completes a sentence, finishes a thought, answers a question, solves a problem, translates one or more foreign language elements, and so forth.

The present development may also contain a customization and personalization module 132 (see FIG. 1) which enables the operator to input personalized information about the user, such as, name, age, sex, interests, etc. The customization module 132 allows the user to become part of the story.

FIGS. 10 through 13 illustrate an exemplary user interface provided to allow the user to access the storybook system. FIG. 10 represents a portal for the storybook game. As noted by the screen, the game may provides two options: one for an adult user or author who wants to write an original story or customize an existing one; and, one for the child end user who wants to play the game. The child accesses the storybook feature by clicking on his story of choice. The adult links to the storybook editor interface of the authoring module 134 (see FIG. 1) by clicking on the words or buttons indicating his preference.

Figure 15:
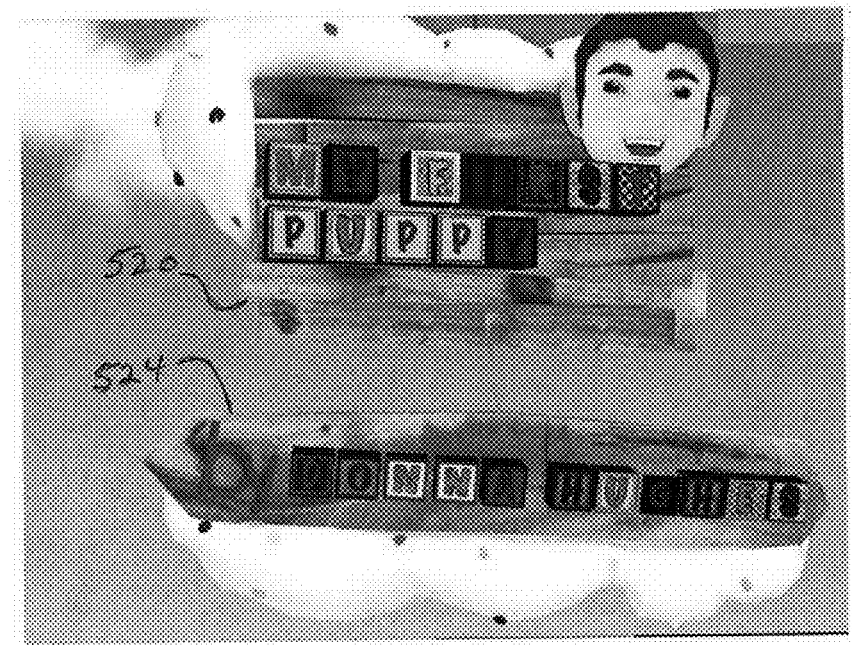

With continued reference to FIG. 10, there appears an exemplary main menu 500 which includes a listing of pre-stored interactive stories 504a-504d selectable by the end user and an on screen selectable object allowing the user to create a custom story. In the preferred embodiments having a customization module, the user may be prompted to enter his or her name for the story. If the user elects not to personalize the story (or, alternatively, in those embodiments which omit the personalization module 134 (see FIG. 1)), the program proceeds to a title page 508 displaying a default title 512 and default author information 516 as shown in FIG. 15. Alternatively, if the user elects to input his or her name and/or a custom title for the story, the title page displays the custom title 520 and the user's name 524 as shown in FIG. 15.

Figure 11:
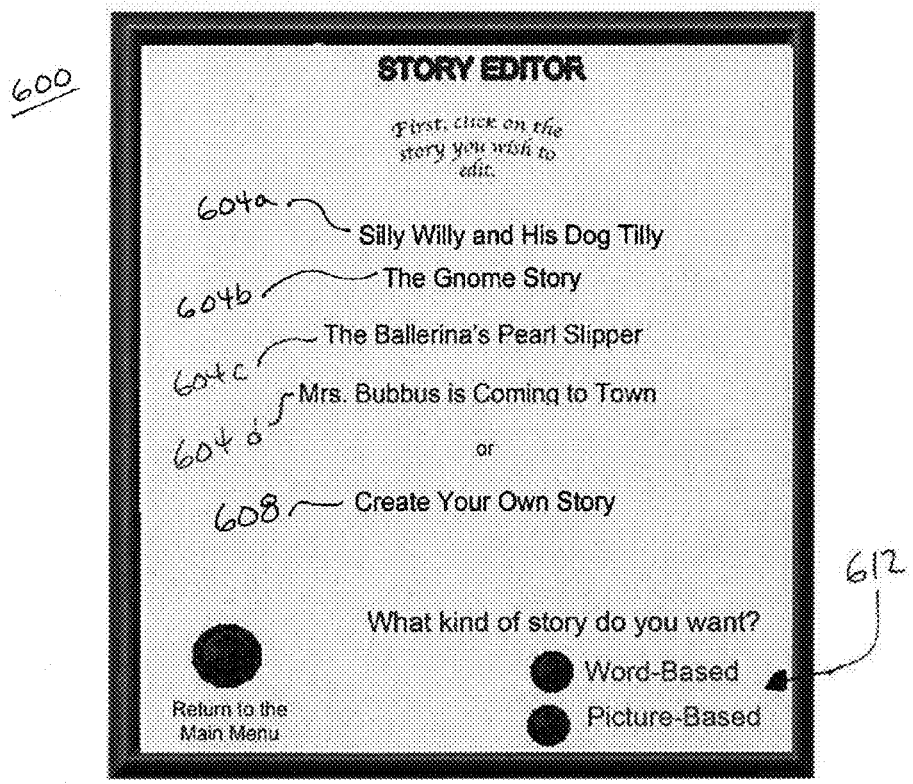
FIG. 11 illustrates an exemplary authoring tool interface in accordance with an exemplary embodiment, e.g., allowing an adult, educator, and so forth to create a new story.
Figure 12:
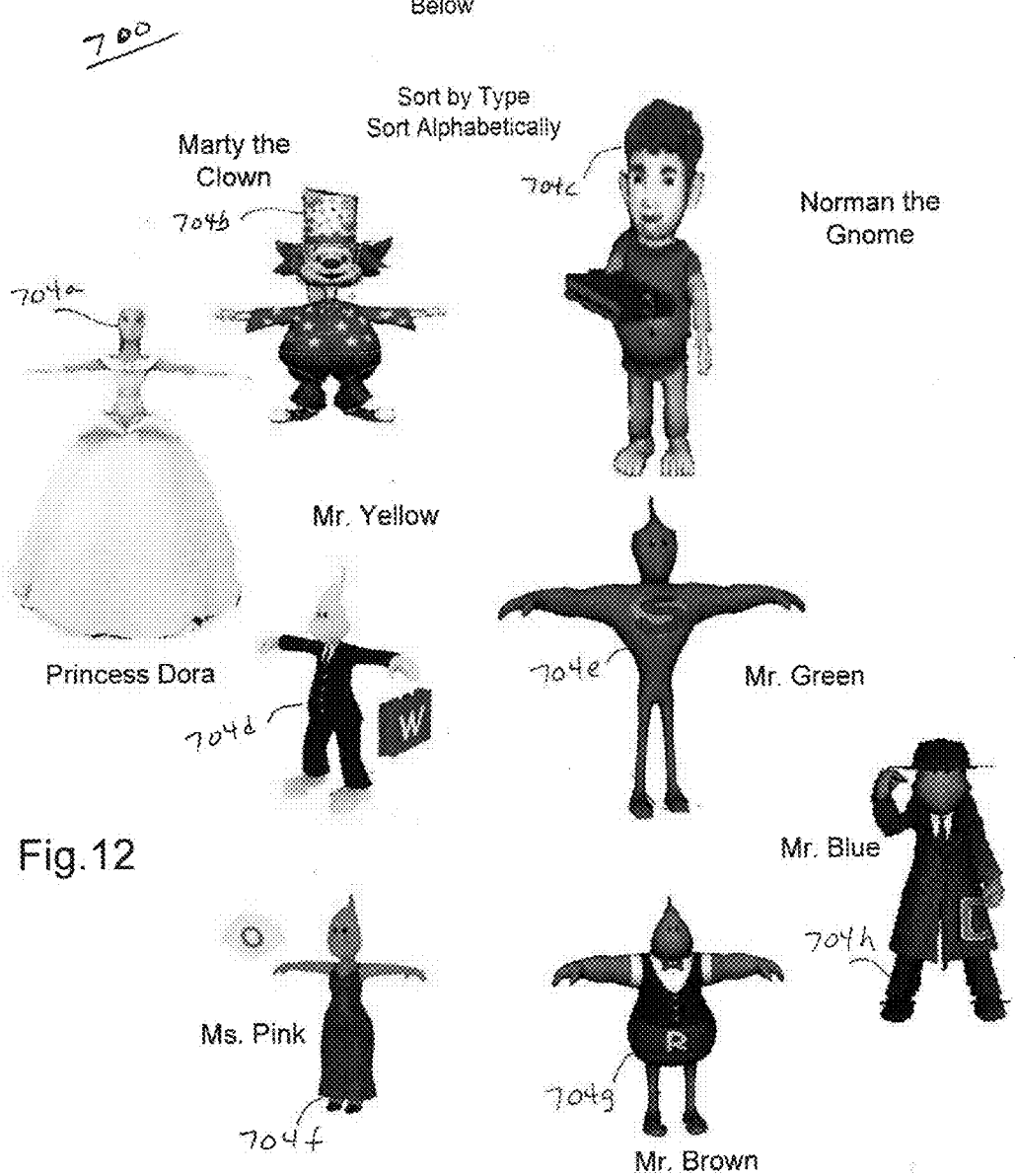
FIG. 12 illustrates a menu of props and animations providing author selectable elements for authoring a new interactive story using the present development.
Figure 13:
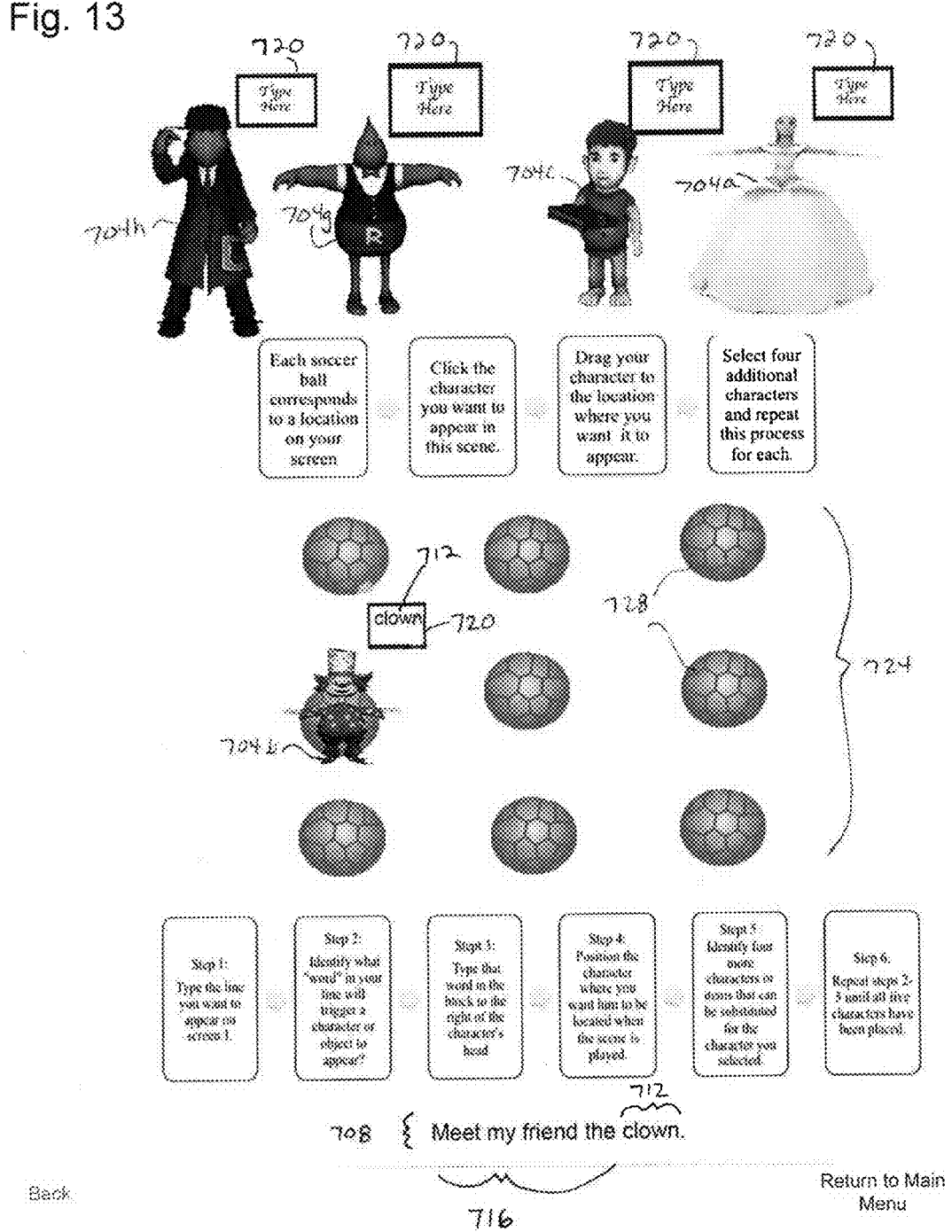
FIG. 13 depicts an exemplary input interface for entry of static and provisional text and graphic corresponding to a scene in a new story to be created using the authoring tool herein.
Figure 14:
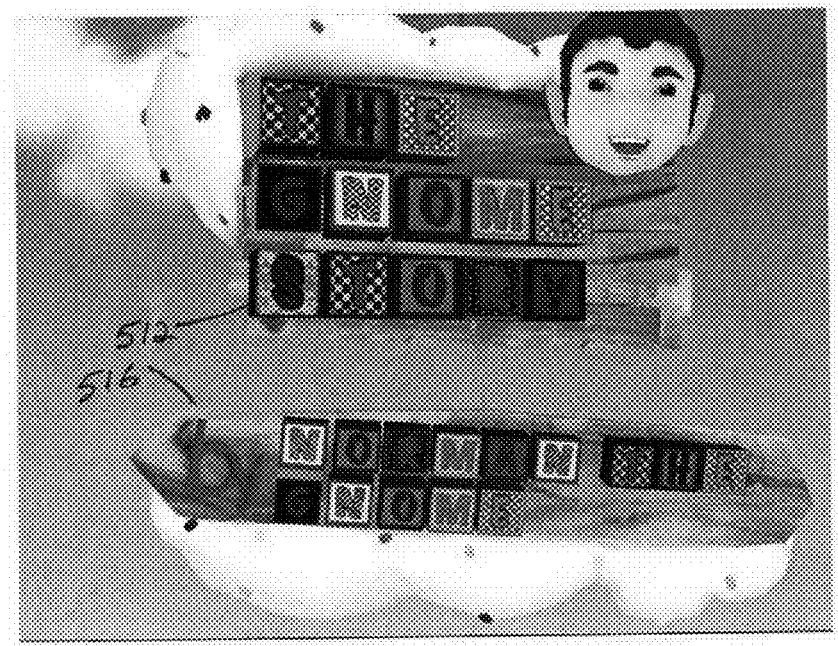
FIGS. 14 and 15 illustrate alternative exemplary title pages or screens displayed in response to a user story selection from the main menu appearing in FIG. 10.

Referring now to FIGS. 10 and 11, there appears an exemplary main menu 500 which allows the child to gain entry to the game system 504a-504d, and allows an adult, such as a parent, educator, healthcare provider, etc., to edit a story 604a-604d or create a new interactive story 508. FIG. 11 provides the user-author the ability to affirm his choice to create a story and access the story input interface 608. An on screen menu option allows an adult user to input data for a new story, e.g., via a story input interface as illustrated in FIGS. 12 and 13. Here, the user-author decides whether he wants to customize some of the features inherent in an existing story or whether he wants to create a story of his own. If the user-author wants to customize an existing story, he clicks on one of the menu items 604a-604d, e.g., corresponding to the title of an existing story and is transported to an interface screen, an exemplary embodiment of which appears in FIG. 13.

If the user-author wishes to create his own story, he clicks on the words or object 608 to that effect, in this case, "Create Your Own Story." In addition, an on-screen option 612, such as a menu or the like, may be provided to give the user-author the option of electing whether to employ the picture-based feature of the storybook. If the user-author engages the picture book feature of the storybook, instead of having words populate the pop up menus, pop up menus will be populated with pictures. Moreover, the words corresponding to the pictures in the popup menus will be automatically inserted into the storyline when the child selects a picture.

FIG. 12 represents a sample menu of 2D and 3D figures the game player might select for use in his game. FIG. 13 provides a sample palette for creating and modifying stories. The user-author can use this screen to type his original story. Or, if the user authored selected an existing story to edit (e.g., using the menu 604a-604d in FIG. 11), that story will be presented on a series of these screens, and the author will edit it in much the same way an original author will develop his storyline as described below. As shown in FIG. 13, lines 708 of the story may be presented at the bottom of the screen. And the characters that the user-author selected (e.g., via the interface screen appearing in FIG. 12) may be positioned at strategic locations on the screen, e.g., vis-à-vis the "placement markers" 728 that represent the staging 724. Lastly, the user-author signals the timing of the character or prop's entrance onto the scene by inputting the word that will trigger the character and prop's arrival in the respective one of the boxes or fields 720, e.g., positioned next to the respective prop or character.

Referring to FIG. 12, there appears a menu 700 of prop and animation objects 704a-704h. These objects are selectable by the user-author and can be inserted into the story. Once inserted, these objects become provisional graphic elements, as they can be replaced by other objects, at the user's discretion. Referring now to FIG. 13, there appears an authoring tool interface which allows the user to input text data 708 for the story. A provisional word 712 is taken from the field 708 and the remainder of the text portion becomes the static text 716. Additional fields 720 are provided to identify additional variables for the provisional text data. Fields selected by the user-author will appear in the popup list 322 selectable during operation by the end user. The objects 704a-704h may be pre-stored objects in the database or library 128 (see FIG. 1), although it is also contemplated that the menu 700 could also include graphics created or uploaded to the program by the author.

In the depicted embodiment of FIG. 13, the author has selected the graphic elements 704b-704a, such that a one-to-one association between the provisional text element 712 and the graphical element 704b is created. Likewise, there is a one-to-one association between the custom word entered in the input fields 720 and the corresponding graphical elements 704a-704h. Although menu of props and animations FIG. 12 and the input screen of FIG. 13 depict the manner of selection of the provisional graphic elements for the creation of a new story by an adult user, it is also contemplated that a like interface for selecting the static or background portion of the graphic/animation component can also be provided.

Although the present development has been described by way of reference to the preferred embodiment wherein the storyline is in the nature of a children's story, it will be recognized that the present innovation is amenable to all manner of stories or subjects. For example, the present development may also be used to teach foreign languages, math or arithmetic skills, etc. Also, the present development may also include storybooks and/or poems to facilitate a therapeutic or healing exchange between a user and a parent, teacher, or mental healthcare provider. Such therapeutic or healing storybooks and poems could assist young people in labeling their emotions, gaining insight into their world, and/or understanding their place in the world.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 234 of one or more computer systems configured generally as shown in FIG. 2. Until required by the computer system, the set of instructions may be stored in another computer readable memory, such as the auxiliary memory 236 of FIG. 2, for example in a hard disk drive or in a removable memory such as an optical disk for utilization in a DVD-ROM or CD-ROM drive, a magnetic media for utilization in a magnetic media drive, a magneto-optical disk for utilization in a magneto-optical drive, or a memory card for utilization in a card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically, or holographically, so that the medium carries computer readable information.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or their equivalents.

Having thus described the preferred embodiments, the invention is now claimed to be:

1. A computer-based interactive storybook system, comprising:
 a processor executing a storybook program;
 a memory storing story data and image data associated with at least one story, each story including at least one user-modifiable scene;

said story data including, for each user-modifiable scene, a static text portion and a plurality of alternative, user selectable text elements;

said system having a first, word-based mode of operation wherein each user selectable text element is selectable by an end user to modify the story and alter the storyline while the story is in progress;

said image data including, for each user-modifiable scene, a static image portion and a plurality of provisional image elements, wherein each of said provisional image elements is associated with a corresponding one of said user selectable text elements;

said storybook program having a second, picture-based mode of operation wherein each of the plurality of image elements is selectable by the end user to modify the story and alter the storyline while the story is in progress;

an input device for selecting from among said plurality of user selectable text elements;

a display for displaying said story data and said image data;

the storybook program configured to respond to the user selectable text elements selected via the first mode of operation and to cause the display of the static text portion in combination with the user selected provisional text elements and to cause the display to display the static image portion in combination with the provisional image element associated with the selected one of the user selectable provisional text elements; and the storybook program configured, responsive to one of the plurality of image elements being selected in the second mode of operation, to cause the display to display the static image portion in combination with the selected one of the provisional image elements and to cause the display to display the static text portion in combination with the user selectable text element that is associated with the selected one of the plurality of provisional image elements.

2. The system of claim 1, further comprising:
for each user-modifiable scene, an on-screen object selectable to display said list of said plurality of user selectable text elements.

3. The system of claim 2, wherein said on-screen object is selected from an on-screen button displayed adjacent to said static text and an on-screen menu of alternative words displayed near said static text.

4. The system of claim 2, wherein said on-screen object is a picture placeholder or changeable graphic overlying said static images portion.

5. The system of claim 1, further comprising:
for each user-modifiable scene, an on-screen object selectable to display said plurality of user selectable provisional image elements.

6. The system of claim 1, further comprising:
an authoring tool for one or both of creating a new story and editing said at least one story.

7. The system of claim 6, wherein said authoring tool includes an author interface for one or both of:
inputting new story data and image data; and
editing said story data and image data.

8. The system of claim 1, further comprising:
animation data outputting a video animation corresponding to said static image elements and selected ones of said provisional image elements on said display.

9. The system of claim 1, further comprising:
an audio output device audibly outputting said story data in spoken form.

10. A computer based interactive storybook method having a first, word-based mode in combination with a second, picture-based mode, the method comprising:
providing an interface for displaying a story on a video display;
storing story data and image data associated with said story, said story including at least one user-modifiable scene;
said story data including, for each user-modifiable scene, a static text portion and a plurality of alternative, user selectable text elements, each user selectable text element selectable by an end user to modify the story while the story is in progress;
said image data including, for each user-modifiable scene, a static image portion and a plurality of provisional image elements;
associating each of said user selectable text elements with a corresponding one of said provisional image elements;
in the first mode, if one of the alternative, user selectable text elements is selected, causing the interface to display the static text portion in combination with the selected one of the user selectable text elements, and causing the interface to display the static image portion in combination with the provisional image element associated with the selected one of the user selectable text elements; and
in the second mode, if one of the plurality of provisional image elements is selected, causing the interface to display the static image portion in combination with the selected one of the user selectable provisional image elements, and causing the interface to display the static text portion in combination with the user selectable text element from the plurality that is associated with the selected one of the user selectable provisional image elements.

11. The method of claim 10, further comprising:
for each user-modifiable scene, providing a first on-screen object on said interface selectable to display said plurality of user selectable text elements, wherein said first on-screen object is selected from one or both of:
an object displayed in the static text portion of the interface; and
an object displayed on the static image portion of the interface.

12. The method of claim 10, further comprising:
for each user-modifiable scene, an on-screen object selectable to display a graphic representation of each of said plurality of user selectable provisional image elements.

13. The method of claim 10, wherein said image data is selected from any one or more of non-animated image data, animated image data, and 3D image data.

14. The method of claim 10, further comprising:
for each user-modifiable scene, providing a second on-screen object selectable to trigger audio playback of said story data.

15. The method of claim 10, further comprising:
providing a customization module for inputting user data representative of a story title, a name of the end user, one or more characteristics of the end user, or any combination thereof; and
updating one or both of said story data and said image data based on said user data.

16. The method of claim 15, wherein said user data is selected from the end user's name, age, likeness, and combinations thereof.

17. The method of claim 10, further comprising:
printing a storybook created by the end user.

18. The method of claim 17, wherein the storybook created by the end user is printed as a coloring book.

19. The method of claim 10, further comprising:
providing an authoring module for one or more of:
editing said story data;
repositioning said image data; and
entering story data and image data for a new story.

20. A non-transitory computer readable medium whose contents cause a computer-based information handling system to perform method steps for creating a story using an interactive storybook having a first, word-based mode and a second, picture based mode, said method steps comprising:
providing an interface displaying a story on a video display;
storing story data and image data associated with said story, said story including at least one user-modifiable scene;
said story data including, for each user-modifiable scene, a static text portion and a plurality of alternative, user selectable text elements, each user selectable text element in the plurality selectable by an end user to modify the story while the story is in progress;
said image data including, for each user-modifiable scene, a static image portion and a plurality of provisional image elements;
associating each of said user selectable text elements with a corresponding one of said provisional image elements;
in the first mode, if one of the alternative, user selectable text elements is selected, causing the interface to display the static text portion in combination with the selected one of the user selectable text elements, and causing the interface to display the static image portion in combination with the provisional image element associated with the selected one of the user selectable text elements; and
in the second mode, if one of the plurality of provisional image elements is selected, causing the interface to display the static image portion in combination with the selected one of the user selectable provisional image elements, and causing the interface to display the static text portion in combination with the user selectable text element from the plurality that is associated with the selected one of the user selectable provisional image elements.

* * * * *